US008867829B2

(12) United States Patent
Braun et al.

(10) Patent No.: US 8,867,829 B2
(45) Date of Patent: *Oct. 21, 2014

(54) METHOD AND APPARATUS FOR EDITING COLOR CHARACTERISTICS OF ELECTRONIC IMAGE

(75) Inventors: Karen M. Braun, Fairport, NY (US); Elizabeth D. Wayman, Ontario, NY (US); Michael P. Kehoe, Rochester, NY (US); Raja Bala, Pittsford, NY (US); Yonghui Zhao, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 636 days.

This patent is subject to a terminal disclaimer.

(21) Appl. No.: 13/116,210

(22) Filed: May 26, 2011

(65) Prior Publication Data

US 2012/0301023 A1    Nov. 29, 2012

(51) Int. Cl.

| G06K 9/00 | (2006.01) |
|---|---|
| G06T 5/40 | (2006.01) |
| G06T 11/00 | (2006.01) |
| G06T 5/00 | (2006.01) |
| G06T 11/60 | (2006.01) |

(52) U.S. Cl.
CPC ..... *G06T 11/001* (2013.01); *G06T 2207/10024* (2013.01); *G06T 5/40* (2013.01); *G06T 5/009* (2013.01); *G06T 11/60* (2013.01); *G06T 2207/20092* (2013.01)
USPC ........................................................ 382/162

(58) Field of Classification Search
USPC ................... 382/162, 167, 254, 274; 345/589, 345/593–594; 358/1.9, 518; 715/700, 723
See application file for complete search history.

(56) References Cited

U.S. PATENT DOCUMENTS

| 7,202,976 | B2 * | 4/2007 | Stone et al. ............... 358/1.9 |
|---|---|---|---|
| 7,680,341 | B2 | 3/2010 | Perronnin |
| 7,701,625 | B2 | 4/2010 | Woolfe et al. |
| 7,756,341 | B2 | 7/2010 | Perronnin |
| 7,885,466 | B2 | 2/2011 | Perronnin |
| 7,885,794 | B2 | 2/2011 | Liu et al. |
| 7,898,696 | B2 | 3/2011 | Marchesotti et al. |
| 8,085,276 | B2 * | 12/2011 | Voliter et al. ............ 345/589 |
| 8,564,796 | B2 * | 10/2013 | Isshiki ..................... 358/1.13 |
| 8,570,339 | B2 * | 10/2013 | Braun et al. ............. 345/594 |
| 8,593,680 | B2 * | 11/2013 | Woolfe et al. ............ 358/1.9 |
| 2007/0009167 | A1 | 1/2007 | Dance et al. |

(Continued)

OTHER PUBLICATIONS

U.S. Appl. No. 13/116,410 to Braun et al., filed May 26, 2011.

(Continued)

*Primary Examiner* — Ishrat I Sherali
(74) *Attorney, Agent, or Firm* — Fay Sharpe LLP

(57) ABSTRACT

A method of editing color characteristics of an electronic image includes: a) receiving an original electronic image at a color editing subsystem; b) analyzing the original electronic image to identify original color characteristics and to identify a recommended set of color editing options, the recommended set of color editing options being less than a complete set of color editing options provided by the color editing subsystem; c) presenting the recommended set to a user via a user interface device; d) receiving a color editing instruction from the user interface device in response to the user selecting a corresponding color editing option from the recommended set; and e) adjusting the original color characteristics to form an adjusted electronic image having adjusted color characteristics based at least in part on the color editing instruction. An apparatus for editing color characteristics of an electronic image is also provided.

20 Claims, 7 Drawing Sheets

(56) References Cited

U.S. PATENT DOCUMENTS

| | | |
|---|---|---|
| 2007/0100786 A1 | 5/2007 | Moroney |
| 2007/0109569 A1 | 5/2007 | Eschbach et al. |
| 2007/0133024 A1 | 6/2007 | Kang et al. |
| 2008/0003547 A1 | 1/2008 | Woolfe et al. |
| 2008/0007749 A1 | 1/2008 | Woolfe |
| 2008/0069456 A1 | 3/2008 | Perronnin |
| 2008/0143738 A1 | 6/2008 | Woolfe et al. |
| 2008/0278744 A1 | 11/2008 | Marchesotti et al. |
| 2008/0317358 A1 | 12/2008 | Bressan et al. |
| 2009/0073465 A1 | 3/2009 | Rolleston et al. |
| 2009/0208118 A1 | 8/2009 | Csurka |
| 2009/0290794 A1 | 11/2009 | Marchesotti |
| 2010/0085377 A1 | 4/2010 | Woolfe |
| 2010/0086230 A1 | 4/2010 | Bala et al. |
| 2010/0110455 A1 | 5/2010 | Woolfe |
| 2010/0226564 A1 | 9/2010 | Marchesotti et al. |
| 2010/0293458 A1 | 11/2010 | Rolleston et al. |
| 2010/0306645 A1 | 12/2010 | Roulland et al. |
| 2013/0027421 A1* | 1/2013 | Bala et al. .................. 345/594 |

OTHER PUBLICATIONS

U.S. Appl. No. 12/826,900 to Bala et al., filed Jun. 30, 2010.

Xerox Brochure No. 610P727010, Automatic Image Enhancement, Xerox Corporation, Oct. 2006, 9 pgs.

Weijer, et al., "Learning Color Names for Real-World Applications", IEEE Transactions on Image Processing, vol. 18, No. 7, Jul. 2009, pp. 1512-1523.

Woolfe, Geoff, "Natural Language Color Editing", Proceedings of the Xerox Innovation Group Conf., 2006, Webster, NY, 5 pages.

Phaser 7500 Tabloid-size Color Printer, Xerox Brochure 610P729870A, Xerox Corp, 2009, 4 pages.

* cited by examiner

METHOD AND APPARATUS FOR EDITING COLOR CHARACTERISTICS OF ELECTRONIC IMAGE

INCORPORATION BY REFERENCE

The following documents are fully incorporated herein by reference: 1) U.S. Pat. App. Publication No. 20120299942 to Braun et al., Ser. No. 13/116,410, entitled "Modifying Color Adjustment Choices Based on Image Characteristics in an Image Editing System," filed May 26, 2011; 2) U.S. Pat. App. Publication No. 20120001934 to Bala et al., Ser. No. 12/826,900, filed Jun. 30, 2010; 3) U.S. Pat. App. Publication No. 2010/0306645 to Roulland et al., Ser. No. 12/473,471, filed May 28, 2009; 4) U.S. Pat. App. Publication No. 2010/0293458 to Rolleston et al., Ser. No. 12/464,212, filed May 12, 2009; 5) U.S. Pat. App. Publication No. 2010/0226564 to Marchesotti et al., Ser. No. 12/400,2771, filed Mar. 9, 2009; 6) U.S. Pat. App. Publication No. 2010/0110455 to Woolfe, Ser. No. 12/262,204, filed Oct. 31, 2008; 7) U.S. Pat. App. Publication No. 2010/0085377 to Woolfe, Ser. No. 12/247,421, filed Oct. 8, 2008; 8) U.S. Pat. App. Publication No. 2010/0086230 to Bala et al., Ser. No. 12/246,559, filed Oct. 7, 2008; 9) U.S. Pat. App. Publication No. 2009/0290794 to Marchesotti, Ser. No. 12/123,511, filed May 20, 2008; 10) U.S. Pat. App. Publication No. 2009/0208118 to Csurka, Ser. No. 12/033,434, filed Feb. 19, 2008; 11) U.S. Pat. No. 7,885,794 to Liu et al., Ser. No. 11/947,859, filed Nov. 30, 2007; 12) U.S. Pat. App. Publication No. 2009/0073465 to Rolleston et al., Ser. No. 11/857,572, filed Sep. 19, 2007; 13) U.S. Pat. App. Publication No. 2008/0317358 to Bressan et al., Ser. No. 11/767,739, filed Jun. 25, 2007; 14) U.S. Pat. App. Publication No. 2008/0003547 to Woolfe et al., Ser. No. 11/762,155, filed Jun. 13, 2007, continuation-in-part of Ser. No. 11/479,484; 15) U.S. Pat. No. 7,898,696 to Marchesotti et al., Ser. No. 11/801,230, filed May 9, 2007; 16) U.S. Pat. No. 7,701,625 to Woolfe et al., Ser. No. 11/533,958, filed Sep. 21, 2006; 17) U.S. Pat. No. 7,885,466 to Perronnin, Ser. No. 11/524,100, filed Sep. 19, 2006; 18) U.S. Pat. App. Publication No. 2008/0007749 to Woolfe, Ser. No. 11/479,484, filed Jun. 30, 2006; 19) U.S. Pat. No. 7,680,341 to Perronnin, Ser. No. 11/418,949, filed May 5, 2006; 20) U.S. Pat. App. Publication No. 2007/0109569 to Eschbach et al., Ser. No. 11/282,850, filed Nov. 17, 2005; 21) U.S. Pat. App. Publication No. 2007/0009167 to Dance et al., Ser. No. 11/174,679, filed Jul. 5, 2005; 22) U.S. Pat. No. 7,756,341 to Perronnin, Ser. No. 11/170,496, filed Jun. 30, 2005; and 23) Automatic Image Enhancement Brochure No. 610P727010, Clearly better image quality, without all the fuss, Xerox Corporation, October 2006 (9 pages).

BACKGROUND

The present exemplary embodiment relates generally to a method and color editing subsystem for color editing of electronic images. It finds particular application in editing color characteristics of electronic images using various techniques to analyze the original image to identify its color characteristics and to identify a recommended set of color editing options associated with the original color characteristics. The recommended set of color editing options is less than a complete set of color editing options provided by the color editing subsystem. The recommended set of color editing options is relevant to the original image or more likely to be selected by a user in editing the image. The reduction of color editing options makes color editing operations easier, particularly to users that do not understand the details of color characteristics. However, it is to be appreciated that the exemplary embodiments described herein are also amenable to color editing of electronic images in an electronic document file and to iteratively performing the color editing process on a given image.

Color printing and image processing applications require a user interface that allows the user to communicate color requirements or instructions. The internal description of these requirements is a highly precise color encoding which is arcane to the uninitiated. Some digital imaging and document editing applications on the market provide powerful and sophisticated tools for experienced users. The learning curve for such tools is quite steep. Other applications provide simple, automatic image fix options for the inexperienced user. However these offer the user little control over the result.

A previous color editing solution introduced a natural language color control system with a dictionary of ordinary language color terms and a working color space, an ordinary language command lexicon, and syntax for use with the ordinary language color terms that correspond to transformations in the working color space. In this system, every portion of the working color space is mapped to at least one term in the color term dictionary. The natural language color control system provides a natural language interface by which users can construct color change sentences to specify the changes they want to make to the image. The system converts these sentences to the mathematical color encodings and makes the specified changes to the image. For additional information on natural language color control systems, see U.S. Pat. App. Publication No. 2008/0007749 to Woolfe, the contents of which are fully incorporated herein by reference.

A natural language color control system is easier for inexperienced users than the previous sophisticated tools. However, there are many possible sentences that may be constructed by the system. Users may be paralyzed or unsure how to proceed because of the amount of choices available to them. This may slow down the color editing being performed by the user and may create other inefficiencies, particularly if the user has to use trial and error methods or otherwise repeat adjustments to color characteristics until they are satisfied with the transformation.

BRIEF DESCRIPTION

In one aspect, a method of editing color characteristics of an electronic image is provided. In one embodiment, the method includes: a) receiving an original electronic image from a source device at a color editing subsystem; b) analyzing the original electronic image to identify original color characteristics associated with the original electronic image and to identify a recommended set of color editing options associated with the original color characteristics, wherein the recommended set of color editing options is less than a complete set of color editing options provided by the color editing subsystem; c) presenting the recommended set of color editing options to a user via a user interface device; d) receiving a color editing instruction from the user interface device in response to the user selecting a corresponding color editing option from the recommended set of color editing options; and e) at least temporarily adjusting the original color characteristics of the original electronic image to form an adjusted electronic image having adjusted color characteristics based at least in part on the color editing instruction.

In another aspect, an apparatus for editing color characteristics of an electronic image is provided. In one embodiment, the apparatus includes: an image input module for receiving an original electronic image from a source device; an image processing module in operative communication with the image input module for analyzing the original electronic image to identify original color characteristics associated with the original electronic image and to identify a recommended set of color editing options associated with the original color characteristics, wherein the recommended set of color editing options is less than a complete set of color editing options provided by the apparatus; a user output module in operative communication with the image processing module for presenting the recommended set of color editing options to a user via a user interface device; a user input module in operative communication with the image processing module for receiving a color editing instruction from the user interface device in response to the user selecting a corresponding color editing option from the recommended set of color editing options; and an image adjusting module in operative communication with the image processing module for at least temporarily adjusting the original color characteristics of the original electronic image to form an adjusted electronic image having adjusted color characteristics based at least in part on the color editing instruction.

In yet another aspect, a non-transitory computer-readable medium storing program instructions that, when executed by a computer, cause a corresponding computer-controlled device to perform a method of editing color characteristics of an electronic image. In one embodiment, the method includes: a) analyzing an original electronic image received from a source device to identify original color characteristics associated with the original electronic image and to identify a recommended set of color editing options associated with the original color characteristics, wherein the recommended set of color editing options is less than a complete set of color editing options provided by the computer-controlled device; b) presenting the recommended set of color editing options to a user interface device; and c) in response to receiving a color editing instruction from the user interface device based on selection of a corresponding color editing option from the recommended set of color editing options, at least temporarily adjusting the original color characteristics of the original electronic image to form an adjusted electronic image having adjusted color characteristics based at least in part on the color editing instruction.

DETAILED DESCRIPTION

Figure 1:
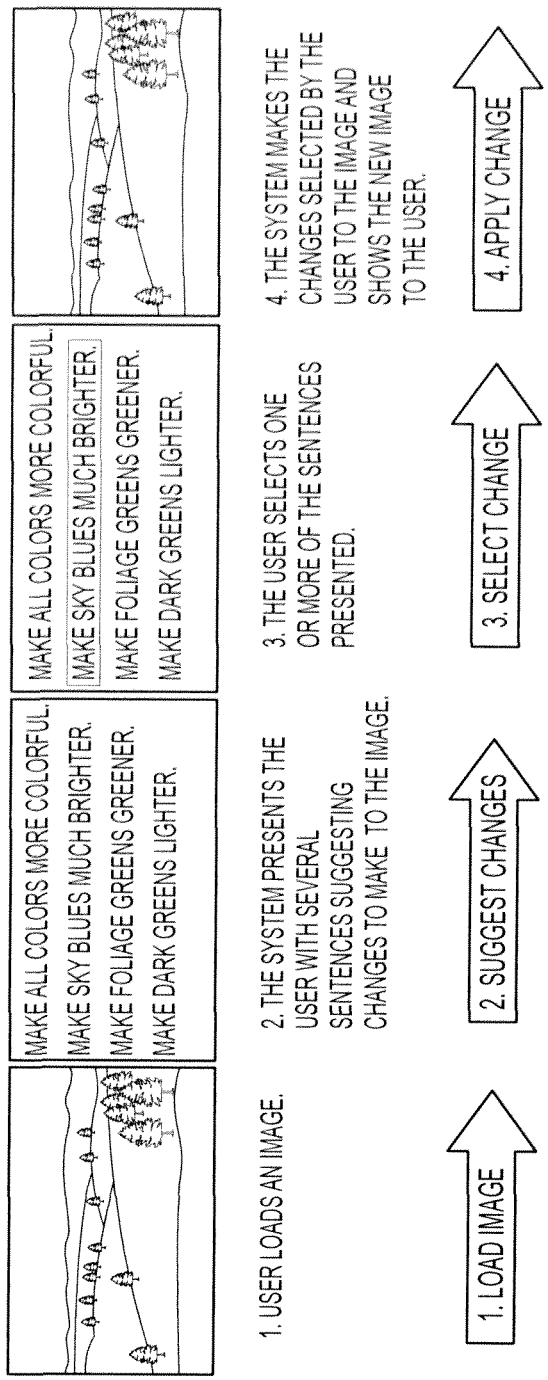
FIG. 1 is a flow diagram of an exemplary embodiment of a process for editing color characteristics of an electronic image in which color editing options are presented in a natural language form.

This disclosure describes various embodiments of methods and color editing subsystems for editing color characteristics of an electronic image. The various techniques analyze an original image to identify its color characteristics and to identify a recommended set of color editing options associated with the color characteristics. The recommended set of color editing options is less than a complete set of color editing options provided by the color editing subsystem. The recommended options are relevant to the original image or more likely to be selected by a user in editing the image. The reduction of color editing options makes color editing operations easier, particularly to users that do not understand the details of color characteristics. Analysis of the original image can be based on a statistical analysis of color editing behaviors of human beings, an image analysis to determine relevant color editing options, an image analysis to determine color editing options likely to enhance the original image, or any combination thereof. The various embodiments can be performed iteratively on the same image.

The various embodiments can also be performed on multiple images in an electronic document either independently or collectively. Collective analyses of multiple images in a document can result in collective image editing options that can be applied to the multiple images simultaneously after selection of a desired color editing options. Alternatively, collective analyses can result in collective image editing options that can be independently selected for each of the multiple images.

The various embodiments of methods and apparatus for editing color characteristics of an electronic image that are disclosed herein make choosing color rendering modifications easier for an inexperienced user than previous color editing systems by offering expert suggestions of modifications to the image in natural language terms. In one embodiment, a color image or document editing system controlled by a natural language interface is disclosed.

The methods and apparatus disclosed herein, for example, build on the natural language color control system disclosed in U.S. Pat. App. Publication No. 2008/0007749 to Woolfe, the contents of which are fully incorporated herein by reference. The Woolfe system allows a user to specify changes to the colors in an image by composing sentences that name the color to be changed and the type of change to make. The various embodiments disclosed herein make it easier for the user by offering suggestions or recommendations of colors to change and what types of changes to make based on image analysis or other criteria such as statistical analysis of user preference data. The user can choose color editing options from the suggestions or recommendations which are a reduced set of options from all color editing options that are available via the color editing system.

The Woolfe system also allows users to verbally specify, using natural language terms, regions of color space to which a particular transform was to be applied. The various embodiments of methods and apparatus disclosed herein extend these capabilities. For example, in one embodiment the user is presented with a dynamically created list of change sentences from which to choose color editing options.

With reference to FIG. 1, a flow diagram of an exemplary embodiment of a process for editing color characteristics of an electronic image shows that the major steps used to change the image including: 1) loading the image, 2) suggesting changes, 3) selecting a change, and 4) applying the change. For example, an exemplary embodiment of a color editing subsystem associated with the process may include the computer platform and peripheral components of the natural language color control system disclosed in U.S. Pat. App. Publication No. 2008/0007749 to Woolfe, the contents of which are fully incorporated herein by reference. As described below, the Woolfe system may be adapted to perform the various embodiments of the process and apparatus disclosed herein.

In the embodiment being described, the user loads an image into the color editing subsystem. The subsystem presents the user with several sentences suggesting changes to make to the image. The user selects one or more of the sentences presented. The highlighted sentence in FIG. 1 depicts the user selection. In this example, the user selected "Make sky blues much brighter." The subsystem changes the image to reflect the changes selected by the user and shows the new image to the user.

The color editing subsystem may also include a means to construct a customized list of color change sentences from which the user may choose one or more sentences. The list may be constructed by using one or more of the following subsystems: i) a statistical analysis subsystem that tailors color editing options based on color editing trends, ii) an image analysis subsystem that tailors color editing options to options relevant to the image content, and iii) an image analysis subsystem that selects color editing options more likely to enhance image quality.

In one embodiment, the color editing subsystem uses the statistical analysis subsystem to construct a set of sentences that users have commonly used to change previous images. These sentences be may derived from any suitable study of color editing behavior. For example, a statistical analysis of sentences that the current user has commonly used to adjust images in the past may be the basis for selection of color editing options using the statistical analysis subsystem. In this embodiment, the color editing subsystem or natural language color editing tool may capture previous user selections, conduct a statistical analysis, and maintain corresponding statistical data regarding available and selected color editing options. For example, perhaps the user always likes images to be very contrasty. Then, this type of behavior would influence the recommended color editing options presented to the user.

In another embodiment, the statistical analysis subsystem used by the color editing subsystem may be based on statistical studies of many users of the color editing subsystem or natural language color editing tool. In yet another embodiment of the color editing subsystem, the statistical analysis subsystem may be based on psychophysical studies conducted for the purpose of collecting color editing data across a broader population of human beings using various types of color editing tools. In additional embodiments of the color editing subsystem, the statistical analysis subsystem may implement the statistical techniques described above or other statistical techniques in any suitable combination.

In another embodiment, the color editing subsystem uses the image analysis subsystem to determine color editing options that are relevant for a particular image. In this embodiment, the color editing subsystem presents corresponding relevant color editing options in natural language sentences. This eliminates color editing options that are not relevant from the larger amount of color editing options available via the color editing system. Thus, this image analysis subsystem first performs image analysis in order to determine which natural language sentences are relevant to the image or document of interest.

Figure 2:
FIG. 2 is an exemplary electronic image for which various exemplary embodiments of a process for editing color characteristics may be used to alter the original color characteristics.

Various types of image analyses and image analysis algorithms could be used to determine relevant color editing options. For example, a color frequency histogram of the image could be constructed to determine which colors are contained in the image. A sentence that uses a color not found in the image would be eliminated from the list presented to the user and optionally replaced with another more appropriate sentence. FIG. 2 is an exemplary electronic image that may be submitted to an image analysis subsystem that uses a color frequency histogram algorithm. Exemplary results from the histogram algorithm for the exemplary image are provided below:

| | |
|---|---|
| 'blue' | 35% |
| 'sky-blue' | 34% |
| 'gray' | 15% |
| 'yellow-green' | 10% |
| 'purple' | 8% |
| 'green' | 7% |
| 'brown' | 7% |
| 'skin tone' | 7% |
| 'white' | 6% |
| 'pink' | 6% |

For example, the histogram results above show that it would not be fruitful to include sentences that adjusted yellows. However, a sentence that adjusted blues, such as "Make the sky-blue much more blue" may be at the top of the list of color editing options. Color editing options can also be recommended or eliminated based on thresholds associated with histogram results. For example, a high threshold can be used to identify color frequencies to which the image is more sensitive. Similarly, a minimum threshold can be used to identify color frequencies to which the image is less sensitive.

In another embodiment, the image analysis subsystem may use an algorithm that performs critical color analysis on the image to determine relevant color editing options. In this embodiment, the color editing subsystem presents sentences relating to salient colors. The critical color analysis algorithm, for example, uses spatial metrics and models of visual attention in addition to color histogram information to determine salient colors in the image. For additional information on critical color analysis, see U.S. Pat. No. 7,701,625 to Woolfe et al., the contents of which are fully incorporated herein by reference.

In yet another embodiment, relevant color editing options may be determined by the image analysis subsystem by performing categorization analysis on the image. Image categorization analysis can determine, for example, if the image contains nature landscapes or human faces. If the image is found to include faces, sentences that include acting on the skin-tones would be relevant. This type of analysis can also be used to categorize the image into other types of predetermined categories, such as indoor versus outdoor, photograph versus synthetic graphics, etc. Existing image categorization tools, such as the Generic Visual Categorizer by Xerox Research Centre Europe (XRCE) of Meylan, France, could be used in this context. For additional information on image categorization analysis, see U.S. Pat. No. 7,885,794 to Liu et al., U.S. Pat. App. Publication No. 2008/0317358 to Bressan et al., U.S. Pat. No. 7,885,466 to Perronnin, and U.S. Pat. No. 7,756,341 to Perronnin, the contents of which are each fully incorporated herein by reference.

In yet another embodiment, the color editing subsystem uses the image analysis subsystem to select color editing options likely to enhance quality for a particular image. In this embodiment, the color editing subsystem uses the image analysis subsystem to determine what could be improved in the image. That is, a currently-available automatic-image enhancement routine could be performed to determine what needs to be improved in the image. These improvements could be suggested to the user as natural language color sentences. For example, a recommended color editing option to enhance the image might be "Make all image colors more contrasty" if the image is analyzed and found to be hazy or otherwise low in contrast. For additional information on analysis for image enhancement, see U.S. Pat. App. Publication No. 2008/0317358 to Bressan et al. and U.S. Pat. App. Publication No. 2007/0009167 to Dance et al., the contents of which are each fully incorporated herein by reference.

The recommended color editing options can be presented to a user via a user interface device using various techniques for presenting information and interactive controls in graphical displays. For example, as described above, the recommended color editing options resulting from analysis of the image can be presented in predetermined sentences to the user for selection of a desired option. In other embodiments, the color editing subsystem can present the resulting color editing options without showing the natural language sentences used to obtain those images. For example, in one embodiment, the user could be presented with an original image and with previews of adjusted images showing how the image would look if "Make the skies bluer," "Make the grass greener," "Make the skies bluer and the grass greener," and "Make all color sunnier" were selected. The user could then choose one of the preview images to select the desired option. This would cause the color editing subsystem to implement a corresponding color editing instruction by adjusting the original image to an adjusted image based on the selected color editing option. In various embodiments, the color editing operation could be iterative to allow the user to repeat the color editing process until the adjusted image is suitable to the user.

In another embodiment, the color editing subsystem may present the user with icons that represent the recommended color editing options. For example, a "Sun" icon could be used as a substitute for the natural language sentence "Make all colors sunnier" or a "Cloud" icon could be used in place of the sentence "Make all colors cloudier."

The color editing subsystem may also include a means to allow the user to choose the desired color editing option to change to the original image by selection of a recommended option from the sentence list, preview image set, or icon set.

In summary, the various embodiments of methods and apparatus disclosed herein simplify color editing operations for images and documents with images, particularly for color-naive consumers. The color editing subsystem and associated methods provide the user with high levels of control and flexibility. In one embodiment, the user is provided with a list of color editing options in the form of color change sentences that makes specifying the changes to the image easier than previous color editing techniques. For example, current natural language color editing techniques include numerous possible combinations of color editing options are available to the user. This includes options that relate to colors that are not present in the original image as well as options that are unlikely to be selected by a user, such as "Make the gray colors more colorful." The various embodiments described herein reduce the color editing options to choices that are relevant to the image or more likely to be selected.

Figure 3:
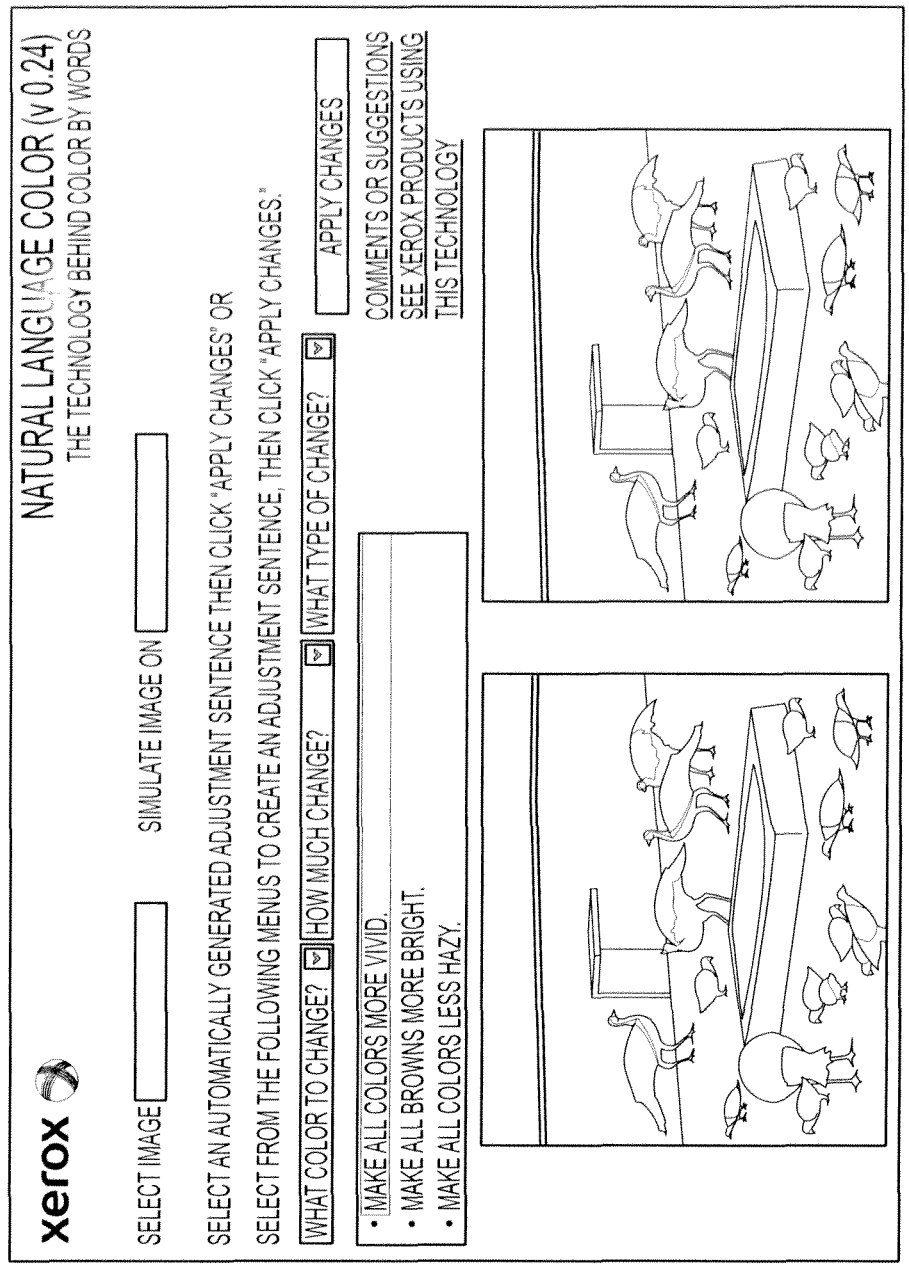
FIG. 3 is an exemplary user interface screen that presents color editing options as a list of natural language sentences on a user interface device in conjunction with an exemplary embodiment of a process for editing color characteristics of an electronic image.
Figure 5:
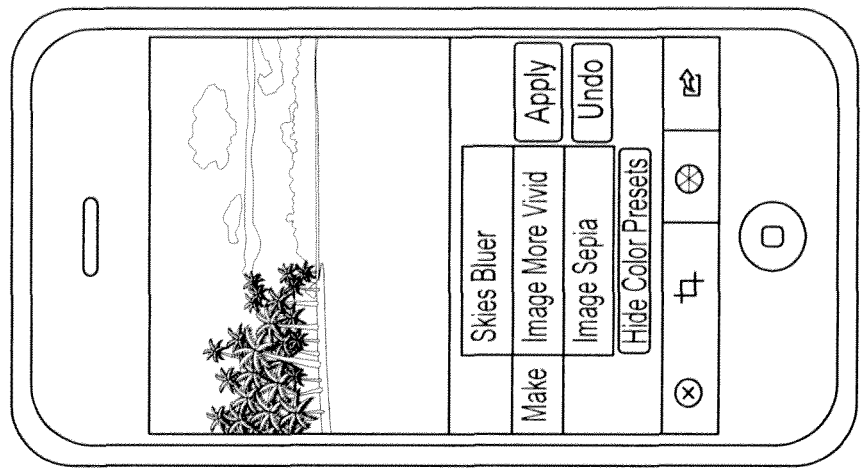
FIG. 5 is an exemplary user interface screen that presents color editing options in a natural language form on a user interface device in conjunction with yet another exemplary embodiment of a process for editing color characteristics of an electronic image.
Figure 4:
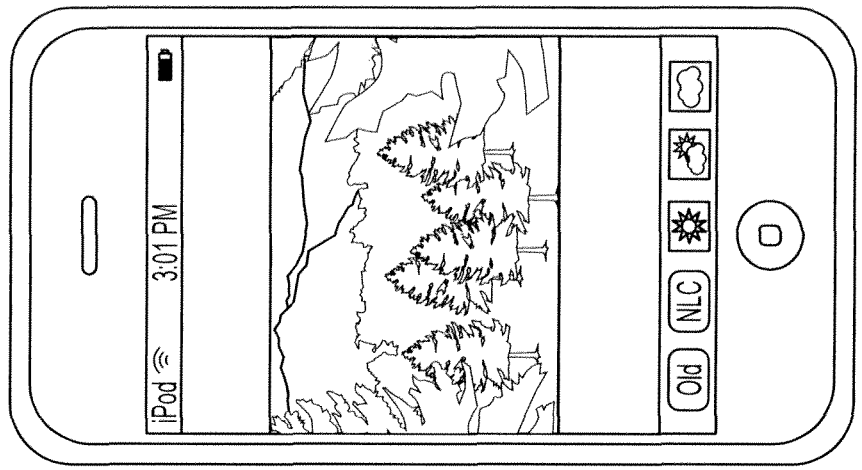
FIG. 4 is an exemplary user interface screen that presents color editing options as a set of icons on a user interface device in conjunction with another exemplary embodiment of a process for editing color characteristics of an electronic image.

Various embodiments of methods and apparatus for editing color characteristics described herein are especially useful in mobile applications where display "real estate" (i.e., display space on the mobile device) is at a premium. For example, FIGS. 3 and 4 show exemplary embodiments for mobile applications. FIG. 3 shows a mobile device with a color editing subsystem that presents recommended color editing options to the user in a set of icons (e.g., sun, partial sun, and cloud icons). FIG. 4 shows a mobile device with a subsystem that presents recommended color editing options in a list of natural language sentences. For additional information on color editing subsystems used in mobile applications, see U.S. Pat. App. Publication No. 20120001934 to Bala et al., Ser. No. 12/826,900, the contents of which are fully incorporated herein by reference.

Figure 6:
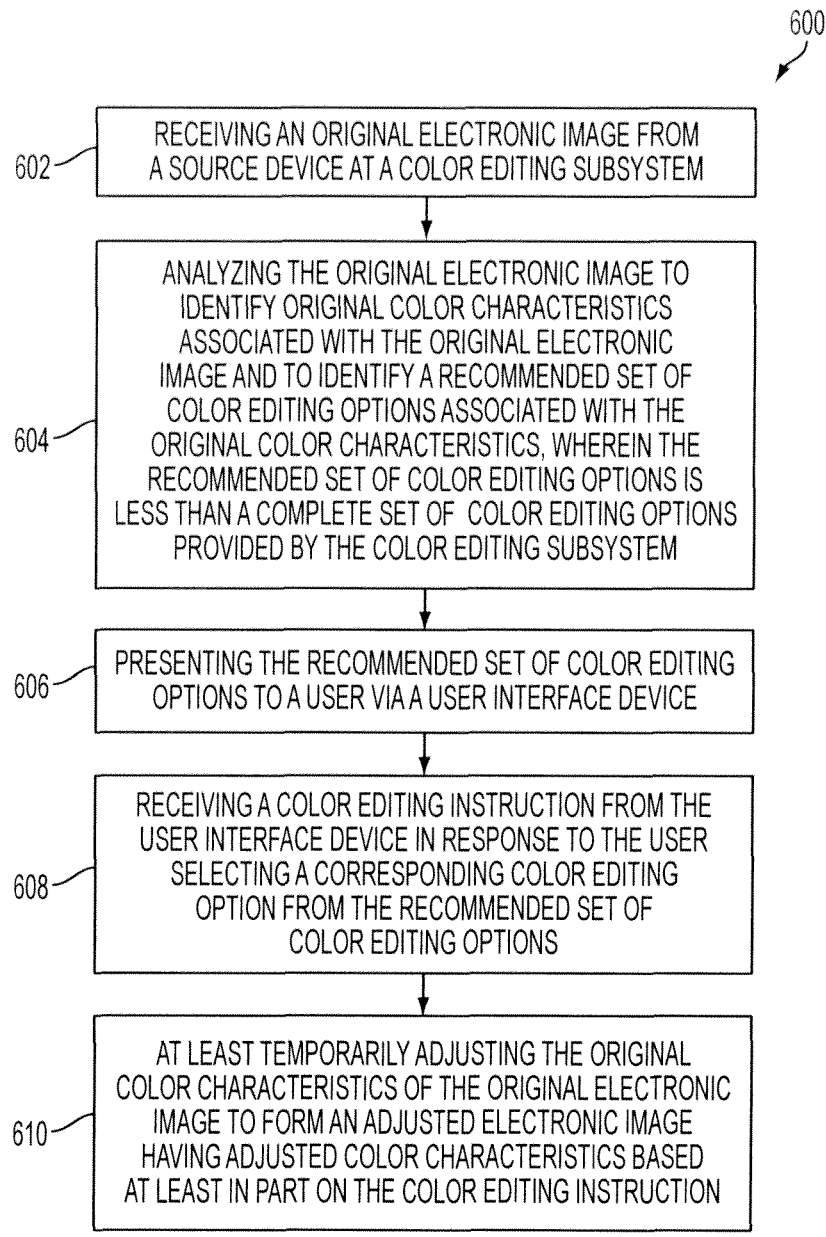
FIG. 6 is a flowchart of still another exemplary embodiment of a process for editing color characteristics of an electronic image.

With reference to FIG. 6, an exemplary embodiment of a process 600 for editing color characteristics of an electronic image begins at 602 where an original electronic image is received from a source device at a color editing subsystem. Next, the original electronic image is analyzed to identify original color characteristics associated with the original electronic image and to identify a recommended set of color editing options associated with the original color characteristics (604). The recommended set of color editing options is less than a complete set of color editing options provided by the color editing subsystem. At 606, the recommended set of color editing options is presented to a user via a user interface device. Next, a color editing instruction is received from the user interface device in response to the user selecting a corresponding color editing option from the recommended set of color editing options (608). At 610, the original color characteristics of the original electronic image are at least temporarily adjusted to form an adjusted electronic image having adjusted color characteristics based at least in part on the color editing instruction.

In another embodiment, the process 600 may also include reducing the complete set of color editing options to the recommended set based at least in part on previous statistical behavior of one or more human beings in editing color images. In a further embodiment of the process 600, the reducing of the complete set of color editing options to the recommended set is based at least in part on previous statistical behavior of the user in editing color characteristics of electronic images that relate to the original color characteristics identified in 604. In another further embodiment of the process 600, the reducing of the complete set of color editing options to the recommended set is based at least in part on previous statistical behavior of a plurality of users in editing color characteristics of electronic images that relate to the original color characteristics identified in 604.

In yet another embodiment, the process 600 may also include reducing the complete set of color editing options to the recommended set based at least in part on eliminating color editing options from the complete set that are not relevant to the original electronic image in view of the original color characteristics identified in 604. In a further embodiment, the process 600 may also include analyzing the original electronic image using an image analysis algorithm that constructs a color frequency histogram, wherein color frequencies that are not present in the color frequency histogram or below a predetermined threshold are considered not relevant and used to reduce the complete set of color editing options to the recommended set. In another further embodiment, the process 600 may also include analyzing the original electronic image using an image analysis algorithm that performs a critical color analysis to determine salient colors present in the original electronic image, wherein salient colors that are not present in the original electronic image or below a predetermined threshold are considered not relevant and used to reduce the complete set of color editing options to the recommended set. In yet another further embodiment, the process 600 may also include analyzing the original electronic image using an image analysis algorithm that performs an image categorization analysis to determine a content category for the original electronic image, wherein certain color editing options that are known to not be relevant for the determined content category are used to reduce the complete set of color editing options to the recommended set.

In still another embodiment, the process 600 may also include analyzing the original electronic image using an image analysis algorithm that identifies certain original color characteristics that contribute to reduced quality of the original electronic image. In this embodiment, certain color editing options that are known to contribute to enhanced quality of the original electronic image by adjusting the certain original color characteristics that currently contribute to reduced quality are used to identify the recommended set of color editing options from the complete set.

In still yet another embodiment of the process 600, the recommended set of color editing options in 606 is presented to the user in natural language form as a list of natural language sentences or as multiple lists of natural language sentence segments arranged such that a combination of selections from each sentence segment list forms a natural language sentence.

In another embodiment of the process 600, the recommended set of color editing options in 606 is presented to the user as a set of preview images, each preview image reflecting the adjusted electronic image that would result from selection of the corresponding color editing option. In a further embodiment of the process 600, each preview image includes a caption that presents the corresponding color editing option to the user in natural language form.

In yet another embodiment of the process 600, the recommended set of color editing options in 606 is presented to the user as a set of icons. In this embodiment, each icon reflects some distinguishing feature of the adjusted electronic image that would result from selection of the corresponding color editing option. In a further embodiment of the process 600, each icon includes a text label that presents the corresponding color editing option to the user in natural language form.

In still another embodiment, the process 600 may also include performing 604 through 610 for the adjusted electronic image in a second iteration of the analyzing in 604, the presenting in 606, the receiving in 608, and the adjusting in 610.

In still yet another embodiment, the process 600 may also include receiving an electronic document file with multiple original electronic images. In this embodiment, the process performs 604 for the multiple original electronic images as a group such that the recommended set of color editing options presented in 606 and the color editing instruction received in 608 apply to the group of multiple original electronic images. Next, in the embodiment being described, the process 600 performs 610 for each multiple original electronic image in the electronic document file to form multiple adjusted electronic images from the respective multiple original electronic images.

In another embodiment, the process 600 may also include sending the adjusted electronic image to the source device. In yet another embodiment, the process 600 may also include sending the adjusted electronic image to an output device for rendering. In still another embodiment, the process 600 may also include sending the adjusted electronic image to a storage device for storage.

Figure 7:
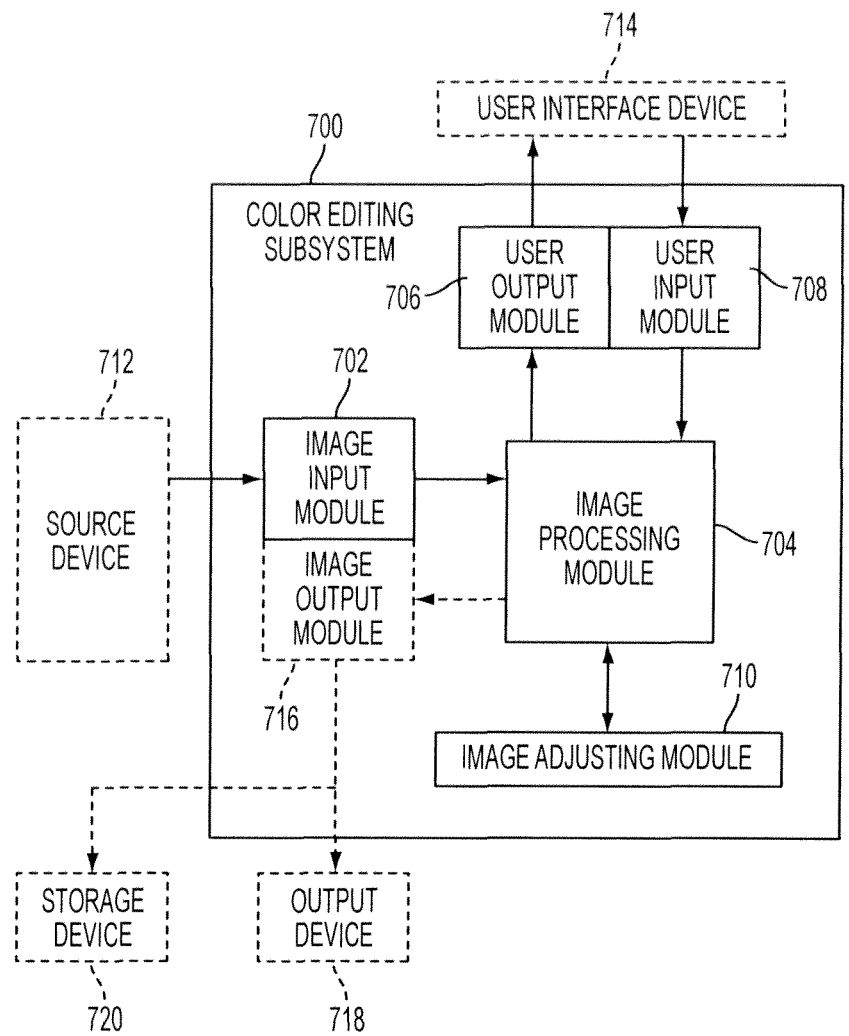
FIG. 7 is a block diagram of an exemplary embodiment of a color editing subsystem for editing color characteristics of an electronic image.

With reference to FIG. 7, an exemplary embodiment of a color editing subsystem 700 for editing color characteristics of an electronic image includes an image input module 702, an image processing module 704, a user output module 706, a user input module 708, and an image adjusting module 710. The image input module 702 is for receiving an original electronic image from a source device 712. In certain embodiments, the source device 712 may include a device that generates an image or document, such as a scanner, a camera, a computer with a software application for generating or editing images or documents, or other suitable devices. In other embodiment, the source device 712 may be a storage device that stores images or documents that may have been generated by any suitable means. The image processing module 704 is in operative communication with the image input module 702 for analyzing the original electronic image to identify original color characteristics associated with the original electronic image and to identify a recommended set of color editing options associated with the original color characteristics. The recommended set of color editing options is less than an complete set of color editing options. The user output module 706 is in operative communication with the image processing module 704 for presenting the recommended set of color editing options to a user via a user interface device 714. The user input module 708 is in operative communication with the image processing module 704 for receiving a color editing instruction from the user interface device 714 in response to the user selecting a corresponding color editing option from the recommended set of color editing options. The image adjusting module 710 is in operative communication with the image processing module 704 for at least temporarily adjusting the original color characteristics of the original electronic image to form an adjusted electronic image having adjusted color characteristics based at least in part on the color editing instruction.

In another embodiment of the color editing subsystem 700, the image processing module 704 reduces the complete set of color editing options to the recommended set based at least in part on previous statistical behavior of one or more human beings in editing color images. In a further embodiment of the color editing subsystem 700, the image processing module 704 reduces the complete set of color editing options to the recommended set based at least in part on previous statistical behavior of the user in editing color characteristics of electronic images that relate to the original color characteristics. In another further embodiment of the color editing subsystem 700, the image processing module 704 reduces the complete set of color editing options to the recommended set based at least in part on previous statistical behavior of a plurality of users in editing color characteristics of electronic images that relate to the original color characteristics.

In yet another embodiment of the color editing subsystem 700, the image processing module 704 reduces the complete set of color editing options to the recommended set based at least in part on eliminating color editing options from the complete set that are not relevant to the original electronic image in view of the original color characteristics. In a further embodiment of the color editing subsystem 700, the image processing module 704 analyzes the original electronic image using an image analysis algorithm that constructs a color frequency histogram. In this embodiment, the color frequencies that are not present in the color frequency histogram or below a predetermined threshold are considered not relevant and used to reduce the complete set of color editing options to the recommended set. In another further embodiment of the color editing subsystem 700, the image processing module 704 analyzes the original electronic image using an image analysis algorithm that performs a critical color analysis to determine salient colors present in the original electronic image. In this embodiment, salient colors that are not present in the original electronic image or below a predetermined threshold are considered not relevant and used to reduce the complete set of color editing options to the recommended set. In yet another further embodiment of the color editing subsystem 700, the image processing module 704 analyzes the original electronic image using an image analysis algorithm that performs an image categorization analysis to determine a content category for the original electronic image. In this embodiment, certain color editing options that are known to not be relevant for the determined content category are used to reduce the complete set of color editing options to the recommended set.

In still another embodiment of the color editing subsystem 700, the image processing module 704 analyzes the original electronic image using an image analysis algorithm that identifies certain original color characteristics that contribute to reduced quality of the original electronic image. In this embodiment, certain color editing options that are known to contribute to enhanced quality of the original electronic image by adjusting the certain original color characteristics that currently contribute to reduced quality are used to identify the recommended set of color editing options from the complete set.

In still yet another embodiment of the color editing subsystem 700, the recommended set of color editing options is presented to the user via the user interface device 714 in natural language form as a list of natural language sentences or as multiple lists of natural language sentence segments arranged such that a combination of selections from each sentence segment list forms a natural language sentence.

In another embodiment of the color editing subsystem 700, the recommended set of color editing options is presented to the user via the user interface device 714 as a set of preview images, each preview image reflecting the adjusted electronic image that would result from selection of the corresponding color editing option. In a further embodiment of the color editing subsystem 700, each preview image includes a caption that presents the corresponding color editing option to the user in natural language form.

In yet another embodiment of the color editing subsystem 700, the recommended set of color editing options is presented to the user via the user interface device 714 as a set of icons. In this embodiment, each icon reflects some distinguishing feature of the adjusted electronic image that would result from selection of the corresponding color editing option. In a further embodiment of the color editing subsystem 700, each icon includes a text label that presents the corresponding color editing option to the user in natural language form.

In still another embodiment of the color editing subsystem 700, the image processing module 704, user output module 706, user input module 708, and image adjusting module 710 perform the same functions for the adjusted electronic image in a second iteration of the analyzing, presenting, receiving, and adjusting functions.

In still yet another embodiment of the color editing subsystem 700, the image input module 704 receives an electronic document file with multiple original electronic images. In this embodiment, the image processing module 704 analyzes the multiple original electronic images as a group such that the recommended set of color editing options presented by the user output module 706 and the color editing instruction received by the user input module 708 apply to the group of multiple original electronic images. In the embodiment being described, the image adjusting module 710 at least temporarily adjusts each multiple original electronic images in the electronic document file to form multiple adjusted electronic images from the respective multiple original electronic images.

In yet another embodiment, the color editing subsystem 700 may also include an image output module 716 in operative communication with the image processing module 704 for sending the adjusted electronic image to an output device 718 for rendering. In still another embodiment, the color editing subsystem 700 may also include an image output module 716 in operative communication with the image process module 704 for sending the adjusted electronic image to a storage device 720 for storage.

If the source device 712 is a storage device, the storage device 720 and the source device 712 may be the same storage device. In this arrangement, the original electronic image and the adjusted electronic image may be separately stored on the same storage device. Alternatively, the adjusted electronic image may replace the original electronic image on the storage device. Of course, even if the source device 712 is a storage device, the storage device 720 on which the adjusted electronic image is stored may be a different storage device.

Figure 8:
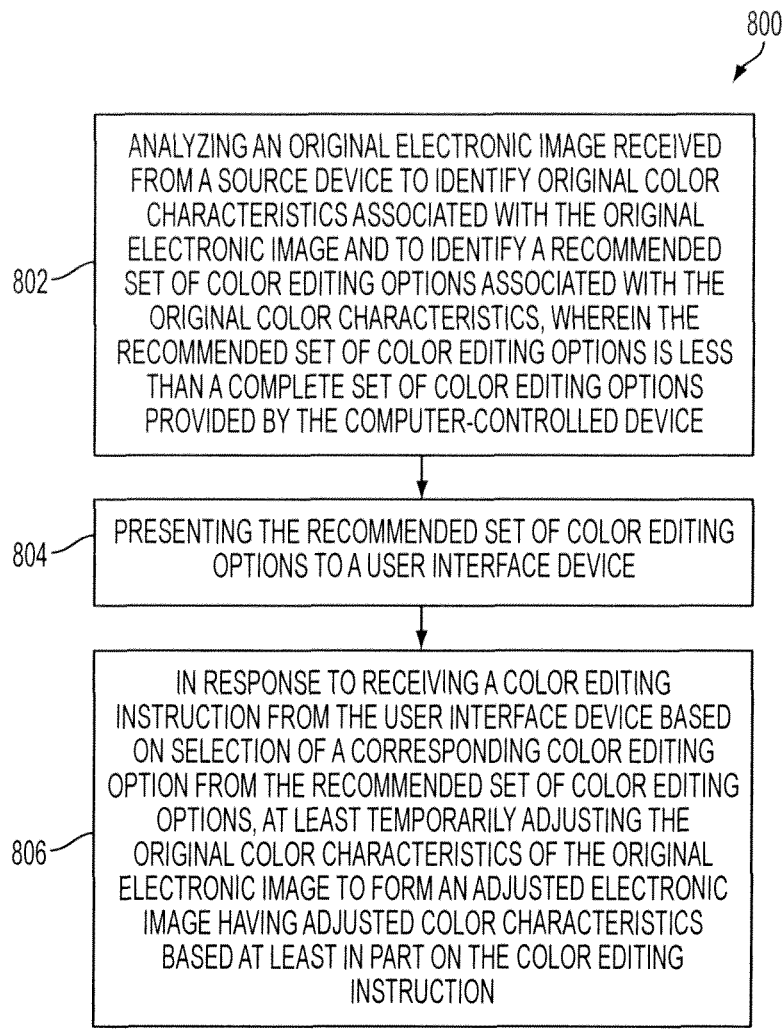
FIG. 8 is a flowchart of an exemplary embodiment of a process for editing color characteristics of an electronic image performed by a computer-controlled device in conjunction with a corresponding computer executing program instructions stored in a non-transitory computer-readable medium.

With reference to FIG. 8, an exemplary embodiment of a process 800 for editing color characteristics of an electronic image that is performed by a computer-controlled device in conjunction with a corresponding computer executing program instructions stored in a non-transitory computer-readable medium begins at 802 where an original electronic image received from a source device is analyzed to identify original color characteristics associated with the original electronic image and to identify a recommended set of color editing options associated with the original color characteristics. The recommended set of color editing options is less than a complete set of color editing options provided by the computer-controlled device. Next, the recommended set of color editing options is presented to a user interface device (804). At 806, in response to receiving a color editing instruction from the user interface device based on selection of a corresponding color editing option from the recommended set of color editing options, the original color characteristics of the original electronic image are at least temporarily adjusted to form an adjusted electronic image having adjusted color characteristics based at least in part on the color editing instruction.

In another embodiment, the process 800 may also include reducing the complete set of color editing options to the recommended set based at least in part on previous statistical behavior of one or more human beings in editing color images. In a further embodiment of the process 800, the reducing of the complete set of color editing options to the recommended set is based at least in part on previous statistical behavior of the user in editing color characteristics of electronic images that relate to the original color characteristics identified in 802. In another further embodiment of the process 800, the reducing of the complete set of color editing options to the recommended set is based at least in part on previous statistical behavior of a plurality of users in editing color characteristics of electronic images that relate to the original color characteristics identified in 802.

In yet another embodiment, the process 800 may also include reducing the complete set of color editing options to the recommended set based at least in part on eliminating color editing options from the complete set that are not relevant to the original electronic image in view of the original color characteristics identified in 802. In a further embodiment, the process 800 may also include analyzing the original electronic image using an image analysis algorithm that constructs a color frequency histogram, wherein color frequencies that are not present in the color frequency histogram or below a predetermined threshold are considered not relevant and used to reduce the complete set of color editing options to the recommended set. In another further embodiment, the process 800 may also include analyzing the original electronic image using an image analysis algorithm that performs a critical color analysis to determine salient colors present in the original electronic image, wherein salient colors that are not present in the original electronic image or below a predetermined threshold are considered not relevant and used to reduce the complete set of color editing options to the recommended set. In yet another further embodiment, the process 800 may also include analyzing the original electronic image using an image analysis algorithm that performs an image categorization analysis to determine a content category for the original electronic image, wherein certain color editing options that are known to not be relevant for the determined content category are used to reduce the complete set of color editing options to the recommended set.

In still another embodiment, the process 800 may also include analyzing the original electronic image using an image analysis algorithm that identifies certain original color characteristics that contribute to reduced quality of the original electronic image, wherein certain color editing options that are known to contribute to enhanced quality of the original electronic image by adjusting the certain original color characteristics that currently contribute to reduced quality are used to identify the recommended set of color editing options from the complete set.

In still yet another embodiment of the process 800, the recommended set of color editing options in 804 is presented to the user in natural language form as a list of natural language sentences or as multiple lists of natural language sentence segments arranged such that a combination of selections from each sentence segment list forms a natural language sentence.

In another embodiment of the process 800, the recommended set of color editing options in 804 is presented to the user as a set of preview images, each preview image reflecting the adjusted electronic image that would result from selection of the corresponding color editing option. In a further embodiment of the process 800, each preview image includes a caption that presents the corresponding color editing option to the user in natural language form.

In yet another embodiment of the process 800, the recommended set of color editing options in 804 is presented to the user as a set of icons. In this embodiment, each icon reflecting some distinguishing feature of the adjusted electronic image that would result from selection of the corresponding color editing option. In a further embodiment of the process 800, each icon includes a text label that presents the corresponding color editing option to the user in natural language form.

In still another embodiment, the process 800 may also include performing 802 through 806 for the adjusted electronic image in a second iteration of the analyzing in 802, the presenting in 804, and the adjusting in 806.

In still yet another embodiment, the process 800 may also include performing 802 for multiple original electronic images of an electronic document file as a group such that the recommended set of color editing options presented in 804 and the color editing instruction received in 806 apply to the group of multiple original electronic images. Next, in this embodiment, the process 800 performs 806 for each multiple original electronic image in the electronic document file to form multiple adjusted electronic images from the respective multiple original electronic images.

In another embodiment, the process 800 may also include sending the adjusted electronic image to the source device. In yet another embodiment, the process 800 may also include sending the adjusted electronic image to an output device for rendering. In still another embodiment, the process 800 may also include sending the adjusted electronic image to a storage device for storage.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of editing color characteristics of an electronic image, comprising:
    a) receiving an original electronic image from a source device at a color editing subsystem;
    b) analyzing the original electronic image to identify original color characteristics associated with the original electronic image and to identify a recommended set of color editing options associated with the original color characteristics, wherein the recommended set of color editing options is less than a complete set of color editing options provided by the color editing subsystem;
    c) presenting the recommended set of color editing options to a user via a user interface device;
    d) receiving a color editing instruction from the user interface device in response to the user selecting a corresponding color editing option from the recommended set of color editing options; and
    e) at least temporarily adjusting the original color characteristics of the original electronic image to form an adjusted electronic image having adjusted color characteristics based at least in part on the color editing instruction.

2. The method set forth in claim 1, further comprising:
    f) reducing the complete set of color editing options to the recommended set based at least in part on previous statistical behavior of one or more human beings in editing color images.

3. The method set forth in claim 2 wherein the reducing in f) is based at least in part on previous statistical behavior of the user in editing color characteristics of electronic images that relate to the original color characteristics identified in b).

4. The method set forth in claim 2 wherein the reducing in f) is based at least in part on previous statistical behavior of a plurality of users in editing color characteristics of electronic images that relate to the original color characteristics identified in b).

5. The method set forth in claim 1, further comprising:
    f) reducing the complete set of color editing options to the recommended set based at least in part on eliminating color editing options from the complete set that are not relevant to the original electronic image in view of the original color characteristics identified in b).

6. The method set forth in claim 5, further comprising:
g) analyzing the original electronic image using an image analysis algorithm that constructs a color frequency histogram, wherein color frequencies that are not present in the color frequency histogram or below a predetermined threshold are considered not relevant and used to reduce the complete set of color editing options to the recommended set.

7. The method set forth in claim 5, further comprising:
g) analyzing the original electronic image using an image analysis algorithm that performs a critical color analysis to determine salient colors present in the original electronic image, wherein salient colors that are not present in the original electronic image or below a predetermined threshold are considered not relevant and used to reduce the complete set of color editing options to the recommended set.

8. The method set forth in claim 5, further comprising:
g) analyzing the original electronic image using an image analysis algorithm that performs an image categorization analysis to determine a content category for the original electronic image, wherein certain color editing options that are known to not be relevant for the determined content category are used to reduce the complete set of color editing options to the recommended set.

9. The method set forth in claim 1, further comprising:
f) analyzing the original electronic image using an image analysis algorithm that identifies certain original color characteristics that contribute to reduced quality of the original electronic image, wherein certain color editing options that are known to contribute to enhanced quality of the original electronic image by adjusting the certain original color characteristics that currently contribute to reduced quality are used to identify the recommended set of color editing options from the complete set.

10. The method set forth in claim 1 wherein the recommended set of color editing options in c) is presented to the user in natural language form as a list of natural language sentences or as multiple lists of natural language sentence segments arranged such that a combination of selections from each sentence segment list forms a natural language sentence.

11. The method set forth in claim 1 wherein the recommended set of color editing options in c) is presented to the user as a set of preview images, each preview image reflecting the adjusted electronic image that would result from selection of the corresponding color editing option.

12. The method set forth in claim 1 wherein the recommended set of color editing options in c) is presented to the user as a set of icons, each icon reflecting some distinguishing feature of the adjusted electronic image that would result from selection of the corresponding color editing option.

13. An apparatus for editing color characteristics of an electronic image, comprising:
an image input device configured to receive an original electronic image from a source device;
an image processing processor configured to analyze the original electronic image to identify original color characteristics associated with the original electronic image and to identify a recommended set of color editing options associated with the original color characteristics, wherein the recommended set of color editing options is less than a complete set of color editing options provided by the apparatus;
a user output device configured to present the recommended set of color editing options to a user via a user interface device;
a user input device configured to receive a color editing instruction from the user interface device in response to the user selecting a corresponding color editing option from the recommended set of color editing options; and
an image adjusting processor configured to at least temporarily adjust the original color characteristics of the original electronic image to form an adjusted electronic image having adjusted color characteristics based at least in part on the color editing instruction.

14. The apparatus set forth in claim 13 wherein the image processing processor is configured to reduce the complete set of color editing options to the recommended set based at least in part on previous statistical behavior of one or more human beings in editing color images.

15. The apparatus set forth in claim 13 wherein the image processing processor is configured to reduce the complete set of color editing options to the recommended set based at least in part on eliminating color editing options from the complete set that are not relevant to the original electronic image in view of the original color characteristics.

16. The apparatus set forth in claim 13 wherein the image processing processor is configured to analyze the original electronic image using an image analysis algorithm that identifies certain original color characteristics that contribute to reduced quality of the original electronic image, wherein certain color editing options that are known to contribute to enhanced quality of the original electronic image by adjusting the certain original color characteristics that currently contribute to reduced quality are used to identify the recommended set of color editing options from the complete set.

17. A non-transitory computer-readable medium storing program instructions that, when executed by a computer, cause a corresponding computer-controlled device to perform a method of editing color characteristics of an electronic image, the method comprising:
a) analyzing an original electronic image received from a source device to identify original color characteristics associated with the original electronic image and to identify a recommended set of color editing options associated with the original color characteristics, wherein the recommended set of color editing options is less than a complete set of color editing options provided by the computer-controlled device;
b) presenting the recommended set of color editing options to a user interface device; and
c) in response to receiving a color editing instruction from the user interface device based on selection of a corresponding color editing option from the recommended set of color editing options, at least temporarily adjusting the original color characteristics of the original electronic image to form an adjusted electronic image having adjusted color characteristics based at least in part on the color editing instruction.

18. The non-transitory computer-readable medium set forth in claim 17, the method further comprising:
d) reducing the complete set of color editing options to the recommended set based at least in part on previous statistical behavior of one or more human beings in editing color images.

19. The non-transitory computer-readable medium set forth in claim 17, the method further comprising:
d) reducing the complete set of color editing options to the recommended set based at least in part on eliminating color editing options from the complete set that are not relevant to the original electronic image in view of the original color characteristics identified in a).

20. The non-transitory computer-readable medium set forth in claim 17, the method further comprising:
   d) analyzing the original electronic image using an image analysis algorithm that identifies certain original color characteristics that contribute to reduced quality of the original electronic image, wherein certain color editing options that are known to contribute to enhanced quality of the original electronic image by adjusting the certain original color characteristics that currently contribute to reduced quality are used to identify the recommended set of color editing options from the complete set.

* * * * *